United States Patent [19]

Schmidt et al.

[11] 4,422,627
[45] Dec. 27, 1983

[54] ENDLESS SPRING, SUCH AS RINGSPRING

[75] Inventors: Helmut Schmidt, Munich; Ulrich Ramm, Neubiberg; Alexander Schroeder, Ottobrunn, all of Fed. Rep. of Germany

[73] Assignee: Messerschmitt-Boelkow-Blohm GmbH, Munich, Fed. Rep. of Germany

[21] Appl. No.: 268,726

[22] Filed: Jun. 1, 1981

[30] Foreign Application Priority Data

Jun. 14, 1980 [DE] Fed. Rep. of Germany ...... 3022418

[51] Int. Cl.³ .................... F16F 1/36; F16F 7/00; B32B 9/04
[52] U.S. Cl. .................... 267/148; 267/141; 267/158; 248/630; 428/109; 428/110; 428/113; 428/246; 428/408
[58] Field of Search .................. 267/30, 146, 147, 148, 267/149, 141, 141.2, 141.4, 182, 151, 158, 160, 164; 428/408, 246, 109, 110, 111, 36, 113; 152/301, 246, 354, 357 R; 248/627, 630

[56] References Cited

U.S. PATENT DOCUMENTS

| 1,126,648 | 1/1915 | Marble | 152/301 |
|---|---|---|---|
| 1,173,850 | 2/1916 | Oliver | 248/627 |
| 1,709,207 | 4/1929 | Gammeter | 267/30 |
| 1,709,828 | 4/1929 | Chilton | 267/30 |
| 1,739,025 | 12/1929 | Chilton | 267/30 |
| 1,789,727 | 1/1931 | Chilton | 267/30 |
| 2,245,444 | 6/1941 | Ross | 152/301 |
| 3,107,698 | 10/1963 | Baker et al. | 428/109 |
| 3,969,568 | 7/1976 | Sperley | 152/357 R |
| 4,319,620 | 3/1982 | Knill | 152/357 R |

FOREIGN PATENT DOCUMENTS

| 655469 | 12/1937 | Fed. Rep. of Germany . |
| 1164757 | 3/1964 | Fed. Rep. of Germany . |
| 52-34161 | 3/1977 | Japan .................... 267/149 |

Primary Examiner—Bruce H. Stoner, Jr.
Assistant Examiner—Robert J. Oberleitner
Attorney, Agent, or Firm—W. G. Fasse; D. H. Kane, Jr.

[57] ABSTRACT

An endless spring is an elastic body such as an oval or elongated or circular ring body for the transmission of loads in a main plane substantially centrally through the endless or ring body. Such a main plane extends in the plane of the drawing. The ring body is made up of a plurality of winding layers of fiber reinforced synthetic material. The windings in certain central body layers (2) preferably extend unidirectionally and the fibers in intermediate layers (3) and in outer layers extend at an angle relative to a main load application direction. The whole spring body includes a plurality of intermediate layers (3) and a plurality of outer layers (4) of synthetic resin impregnated fabric plies. The central body layers (2) form a winding body.

13 Claims, 4 Drawing Figures

ENDLESS SPRING, SUCH AS RINGSPRING

BACKGROUND OF THE INVENTION

The present invention relates to an endless spring such as a ringspring. A ring in this context does not need to be circular, it may be oval, or it may have any other suitable endless shape. Such springs may take up loads in the main plane of the ring. The main plane in this context is the plane coinciding with the plane of the drawing.

Prior art ringsprings of this type are made of metallic materials, preferably spring steel. Endless springs made of spring steel are capable of storing energy or potential energy, however, they do not have any damping characteristics. On the other hand, endless springs made of rubber elastic materials have good damping characteristics, however, they are not suitable for supporting substantial loads.

OBJECTS OF THE INVENTION

In view of the above it is the aim of the invention to achieve the following objects singly or in combination:

to construct an endless or so-called ring type spring which is capable of storing energy and simultaneously providing desired damping characteristics so that it is suitable for use under high load operating conditions;

to construct the ringspring in such a manner that certain parts of the spring primarily take up normal loads and bending loads while other parts of the spring primarily take up crosswise extending tension loads as well as crossforces causing a pressure load in the crosswise direction; and to arrange the components of the spring in such a manner that a mutual stiffening is accomplished by the formation of triangular, so-called "Easer" frameworks or "Easer" trussworks.

SUMMARY OF THE INVENTION

According to the invention there is provided an endless or ringspring capable of taking up loads in the main ring plane which is characterized by a winding body comprising a plurality of layers of fiber reinforced synthetic material. The fibers may be glass fibers and/or carbon fibers or the like. The synthetic material may be of the synthetic resinous type.

The present spring comprises a plurality of layers. One type of layers, the so-called body layers, have the fibers extending unidirectionally. The body layers are interposed between outer layers forming the outer skin, so to speak, of the spring and intermediate layers interposed between adjacent body layers. The intermediate layers and the body layers may comprise one or several plies of fabric or webbing of fiber materials impregnated by a synthetic resin, whereby the direction of the fiber extension may be at an angle relative to the main load application direction. Such angle may be, for example, 0° in which case the fibers extend in parallel to the load application direction. The angle may be 90° in which case the fibers extend at a right angle relative to the direction of load application. The angle may be ±45° in which case the fibers extend, so to speak, diagonally across the direction of load application.

We advantageously utilize the favorable characteristics of fiber reinforced synthetic materials for the purpose of spring action and simultaneous damping. As mentioned, the arrangement is such, that the unidirectionally extending fiber layers take up primarily normal compression and bending forces, whereas the laminated intermediate and outer layers primarily take up crosswise extending tension loads and crosswise extending forces which also may cause compression loads.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
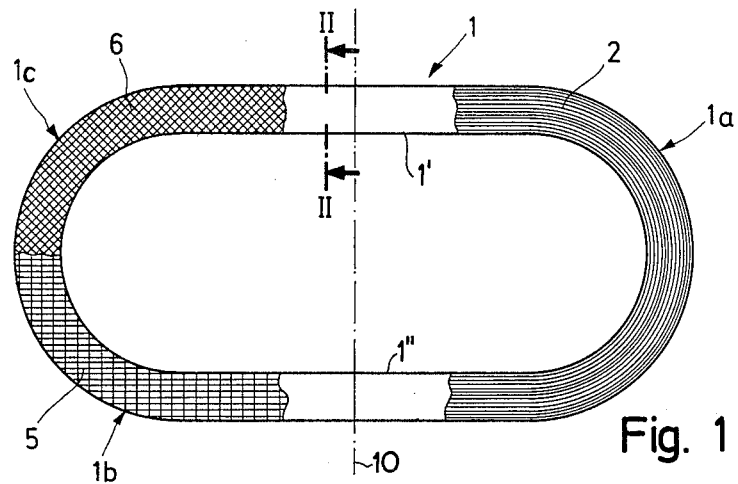
FIG. 1 is a top plan view of an endless spring according to the invention partially in section, whereby the sectional plane extends in the plane of the drawing constituting the main plane of the endless spring.
Figure 4:
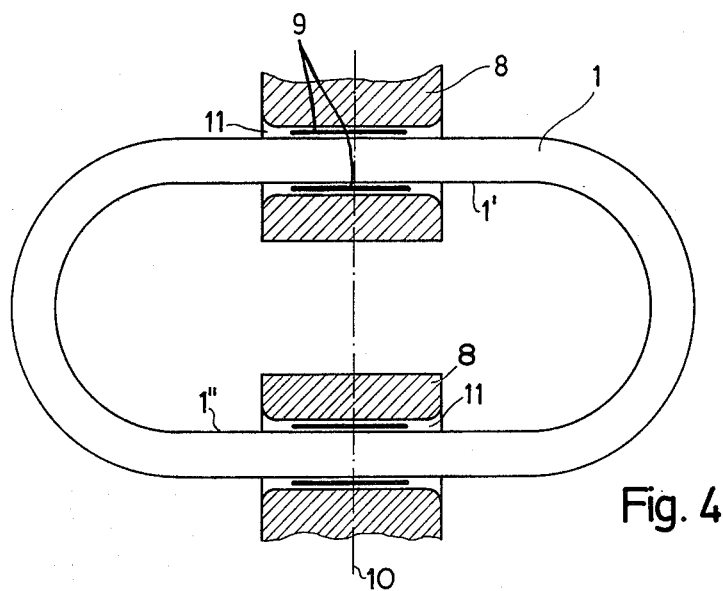
FIG. 4 illustrates the endless spring according to FIG. 1, equipped with a spring attachment member or mechanism partially in section for applying a load to the endless spring.

FIG. 1 shows the outer shape of an endless spring 1 which comprises straight leg portions 1' and 1" as well as curved end portions 1a and 1b. Part of the leg portions 1', 1" are not shown in section, however, the sectional plane for the rest of the spring extends in the plane of the sheet of the drawing. A central load application direction is shown by the dashed line 10. The invention is not limited to the illustration of FIG. 1. Springs according to the invention may have, for example, a circular ring shape or any other suitable shape. The provision of straight legs 1', 1" has been found to be especially suitable for the connection of a load application device 8 as shown in FIG. 4 to be described in more detail below.

Referring further to FIG. 1 the right-hand curve portion 1a shows a section through the winding body portion 2 of the present spring in which the reinforcing fibers all extend in the same direction or unidirectionally in parallel to one another. The portion 1b in the lower left-hand corner of FIG. 1 shows a section through a ply 5 in which the fibers of the reinforcing webbing run at 0° and at 90° relative to the load application axis. The fibers extending at 0° thus run in parallel to the axis 10 and the fibers extending at 90° thus run at a right angle across the direction 10. In the upper left hand portion of FIG. 1 there is shown at 1c a section through a ply 6 in which the reinforcing fibers extend at ±45° to the direction 10, thereby crossing that direction in a diagonal type arrangement of the fibers. This type of structure has the advantage of a lightweight and variable spring stiffness while simultaneously being able to take up very high static as well as dynamic loads.

Figure 2:
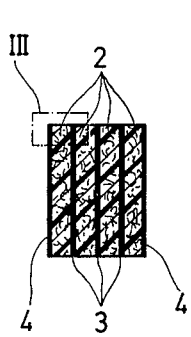
FIG. 2 is a sectional view along section line II—II in FIG. 1.
Figure 3:
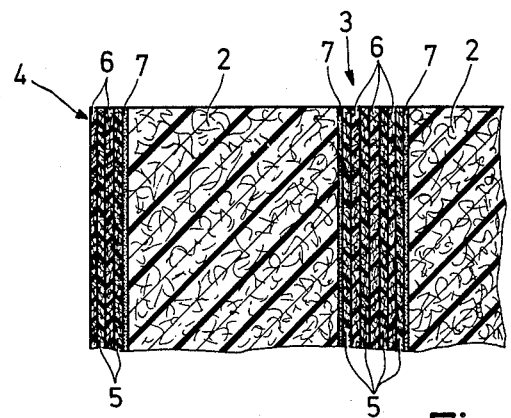
FIG. 3 is an enlarged illustration of the zone III in FIG. 2.

FIGS. 2 and 3 illustrate the inner structure of the endless spring 1 comprising a winding body 2 in which the fibers in the individual plies extend in parallel to one another unidirectionally relative to the plane of the spring, said plane extending in the plane of the drawing. Intermediate layers 3 may also comprise one or a plurality of plies and are arranged between two body layers or plies 2. Outer layers 4 form the outer skin of the spring body. Each of the intermediate layers 3 and each of the two outer layers 4 may comprise, as stated, a plurality of plies 5 or 6 of fiber reinforced, synthetic materials such as resin material. The fiber directions may extend either in parallel or at 90° as explained above with reference to the plies 5 or they may extend at ±45° as explained above with reference to the plies 6.

FIG. 3 illustrates the structure and location of the intermediate layers 3 and the outer layers 4. The arrangement is such that plies 5 with fibers extending at 0 and 90° alternate with plies 6 in which the fibers extend at ±45°, whereby the outer layers forming the skin have an outer ply 6 with a ±45° fiber arrangement. Such an arrangement of the webbing plies with fiber directions which differ in the individual sections of the endless spring makes sure that all cross-tension forces, all normal compression forces, and all shearing loads are taken up properly, whereby the two fiber layers cooperate in mutually stiffening each other by the formation of triangularly shaped so-called "Fiber" frameworks or trussworks.

In order to improve the adhesive connection between the wound unidirectional layers 2 and the respective intermediate layers and outer layers 4, the invention provides adhesive layers 7 as shown in FIG. 3. These adhesive layers may be so-called adhesive prepregs or other suitable adhesive means. The number of plies 5 and 6 as well as the mutual coordination of these plies in the respective intermediate layers 3 and outer layers 4 may be varied in accordance with individual load requirements.

FIG. 4 shows somewhat schematically the connection of the spring 1 to a spring attachment member 8 for applying a load to the straight legs 1', 1" of the spring 1. The member 8 may be part of a force transmitting device (not shown) and will move vertically up or down. In order to protect the spring 1 against excessive wear and tear along the leg portions where the load application device 8 is connected to the spring, the invention provides plates 9 between the surface of the spring and a bore 11 in the device 8. The plates 9 are highly wear and tear resistant and are made, for example, of spring steel. By varying the length and thickness of the plates 9 it is possible to influence the size of the occurring clamping forces or load application forces. Particularly, the size of the cross-forces resulting from the clamping moment may be influenced and the spring stiffness may be varied, for example, for the purpose of compensating manufacturing tolerances. If necessary, it is possible to use several plates or platelets stacked one on top of the other.

Although the invention has been described with reference to specific example embodiments, it will be appreciated, that it is intended to cover all modifications and equivalents within the scope of the appended claims.

What is claimed is:

1. An endless spring comprising substantially straight leg portions connected by curved end portions, said endless spring forming a frame having a frame plane for taking up loads extending in said frame plane in a main load application direction, comprising a spring body having a plurality of layers (2, 3, 4) made of fiber compound materials and extending in parallel to said frame plane, said layers comprising a first layer type (2) in which fiber bundles are wound so that all the fibers extend unidirectionally in said first layer type and a second layer type (3, 4), each said second layer type comprising at least two plies (5, 6) in which the fibers extend in cross-over relationship relative to each other, said first layer type and said second layer type being arranged in alternate succession relative to each other.

2. The endless spring of claim 1, wherein said second layer type comprises one layer more than said first layer type so that the second layer type forms outer surfaces parallel to said frame plane, and so that said first layer type forms inner layers interconnected by a second type layer between two neighboring first type layers.

3. The endless spring of claim 1, wherein said plies (5, 6) of said second layer type (3, 4) comprise at least one first ply (5) with fibers extending in parallel and at 90° relative to said main load application direction, and at least one second ply (6) with fibers extending in a ±45° cross-over relationship relative to said main load application direction.

4. The endless spring of claim 3, wherein each of said second layer type (3, 4) comprises said first and second plies (5, 6), wherein a second layer type (3) located internally of the spring between two first layer types (2) comprises at least two first plies (5) and a second ply (6) located between said two first plies (5), and wherein a second layer type (4) located externally of the spring comprises at least one first ply (5) and at least one second ply (6) located on the outside of the spring.

5. The spring of claim 1, wherein each of said first layer type (2) comprises at least two fiber bundles.

6. The spring of claim 1, wherein said plies of said second layer type are made of fibers of different materials.

7. The spring of claim 1, wherein said fiber bundles of said first layer type (2) are made of fibers of different materials.

8. The spring of claim 1, wherein said fiber bundles of said first layer type (2) and said plies of said second layer type (3, 4) are made of fibers of different materials.

9. The spring of claim 1, further comprising adhesive layers (7) operatively interposed between said first and second layer types.

10. The spring of claim 1, further comprising spring attachment means (8) operatively secured to said endless spring for applying a load to the spring, and wear resistant plate means (9) operatively interposed between said spring attachment means and said endless spring for reducing the wear imposed by the atrachment means on the spring.

11. The spring of claim 10, wherein said plate means (9) are made of spring steel.

12. The spring of claim 1, wherein said first and second layer types (2, 3, 4) form an endless loop having two straight legs extending in parallel to each other and two curved end portions operatively interconnecting said straight legs.

13. The spring of claim 1, wherein said spring body has a rectangular cross-section.

* * * * *